United States Patent
Ran et al.

(10) Patent No.: US 11,389,711 B2
(45) Date of Patent: Jul. 19, 2022

(54) FITNESS GUIDANCE METHOD, DEVICE AND STORAGE MEDIUM

(71) Applicant: BAIDU ONLINE NETWORK TECHNOLOGY (BEIJING) CO., LTD., Beijing (CN)

(72) Inventors: Ruilong Ran, Beijing (CN); Jinglei Yu, Beijing (CN); Wanghong Yuan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 660 days.

(21) Appl. No.: 16/141,447

(22) Filed: Sep. 25, 2018

(65) Prior Publication Data

US 2019/0143191 A1 May 16, 2019

(30) Foreign Application Priority Data

Nov. 16, 2017 (CN) .......................... 201711138234.2

(51) Int. Cl.
*A63B 71/00* (2006.01)
*A63B 24/00* (2006.01)
(Continued)

(52) U.S. Cl.
CPC .......... *A63B 71/00* (2013.01); *A63B 24/0087* (2013.01); *A63B 71/0054* (2013.01); *A63B 71/0622* (2013.01); *G06V 40/161* (2022.01); *G06V 40/165* (2022.01); *G06V 40/171* (2022.01); *G06V 40/174* (2022.01); *A63B 22/025* (2015.10); *A63B 2024/0093* (2013.01); *A63B 2071/0081* (2013.01); *A63B 2071/063* (2013.01); *A63B 2071/065* (2013.01);
(Continued)

(58) Field of Classification Search
CPC combination set(s) only.
See application file for complete search history.

(56) References Cited

U.S. PATENT DOCUMENTS

2002/0033753 A1* 3/2002 Imbo ................ G06Q 30/02
340/7.48
2009/0251560 A1* 10/2009 Azar ................. G07C 9/37
348/222.1

(Continued)

FOREIGN PATENT DOCUMENTS

CN 104077579 A 10/2014
CN 104144192 A 11/2014
(Continued)

OTHER PUBLICATIONS

Chinese Patent Application No. 201711138234.2 First Office Action dated Apr. 27, 2021, 7 pages.
(Continued)

*Primary Examiner* — Phung-Hoang J Nguyen
(74) *Attorney, Agent, or Firm* — Lathrop GPM LLP

(57) ABSTRACT

The present disclosure provides a fitness guidance method, a device and a storage medium. The method includes: collecting a face image of a user in real time in response to detecting a sport event of the user; performing recognition on the face image; determining a current sport state of the user based on a face recognition result; and providing a prompt for advising the user based on the current sport state.

12 Claims, 4 Drawing Sheets

(51) Int. Cl.
*A63B 71/06* (2006.01)
*G06V 40/16* (2022.01)
*A63B 22/02* (2006.01)

(52) U.S. Cl.
CPC . *A63B 2071/068* (2013.01); *A63B 2071/0625* (2013.01); *A63B 2071/0627* (2013.01); *A63B 2071/0675* (2013.01); *A63B 2071/0677* (2013.01); *A63B 2220/05* (2013.01); *A63B 2220/806* (2013.01); *A63B 2220/807* (2013.01); *A63B 2220/808* (2013.01); *A63B 2225/15* (2013.01); *A63B 2225/20* (2013.01); *A63B 2225/50* (2013.01); *A63B 2230/00* (2013.01)

(56) References Cited

U.S. PATENT DOCUMENTS

| | | | | |
|---|---|---|---|---|
| 2013/0123667 | A1* | 5/2013 | Komatireddy | A61B 5/7475 600/595 |
| 2015/0235075 | A1* | 8/2015 | Rose | G06K 9/00288 382/103 |
| 2015/0304195 | A1* | 10/2015 | Bhargav-Spantzel | H04L 43/10 709/224 |
| 2016/0163332 | A1* | 6/2016 | Un | G06F 16/90332 704/260 |
| 2017/0001074 | A1* | 1/2017 | Krueger | A61B 5/4872 |
| 2017/0100637 | A1 | 4/2017 | Princen | |
| 2017/0263251 | A1* | 9/2017 | Jin | G10L 17/22 |
| 2018/0345081 | A1* | 12/2018 | Lee | G06K 9/00335 |

FOREIGN PATENT DOCUMENTS

| | | |
|---|---|---|
| CN | 104298722 A | 1/2015 |
| CN | 105854268 A | 8/2016 |
| CN | 106055873 A | 10/2016 |

OTHER PUBLICATIONS

Chinese Patent Application No. 201711138234.2 English translation of First Office Action dated Apr. 27, 2021, 11 pages.

* cited by examiner

FITNESS GUIDANCE METHOD, DEVICE AND STORAGE MEDIUM

CROSS-REFERENCE TO RELATED APPLICATION

This application claims priority to and benefits of Chinese Patent Application No. 201711138234.2, filed on Nov. 16, 2017, the entire content of which is incorporated herein by reference for all purposes.

FIELD

The present disclosure relates to a field of fitness devices and image recognition technologies, and more particularly to, a fitness guidance method, a device and a storage medium.

BACKGROUND

At present, people participate actively in sports, including outdoor sports and sports in a gym. To know sport data, such as a sport duration, walking steps and/or running steps, a user usually wears a wearable device for recording sport data when performing the outdoor sports.

However, some cases often exist as follows. Many people are blind to excessively exercise without considering own situation, resulting in accidents in sports, or discomfort after sporting.

SUMMARY

In a first aspect, embodiments of the present disclosure provide a fitness guidance method, including: collecting a face image of a user in real time in response to detecting a sport event of the user; performing recognition on the face image; determining a current sport state of the user based on a face recognition result; and providing a prompt for advising the user based on the current sport state.

In a second aspect, embodiments of the present disclosure provide a device, including one or more processors, at least one camera, and a storage device. The at least one camera is configured to collect a face image of a user in real time in response to detecting a sport event of the user. The storage device is configured to store one or more programs. The one or more processors are configured to execute the one or more programs to implement the fitness guidance method according to the first aspect.

In a third aspect, embodiments of the present disclosure further provide a computer readable storage medium stored with computer programs thereon. The computer programs are configured to be executed to implement the fitness guidance method according to the first aspect.

DETAILED DESCRIPTION

Detailed illustration will be made to the present disclosure with reference to accompanying drawings and embodiments in the following. Detailed embodiments described herein are intended to explain the present disclosure, and not a limitation for the present disclosure. In addition, it should be noted that, to facilitate description, the accompanying drawings only illustrate a part related to the present disclosure but not all the present disclosure.

Embodiment One

Figure 1:
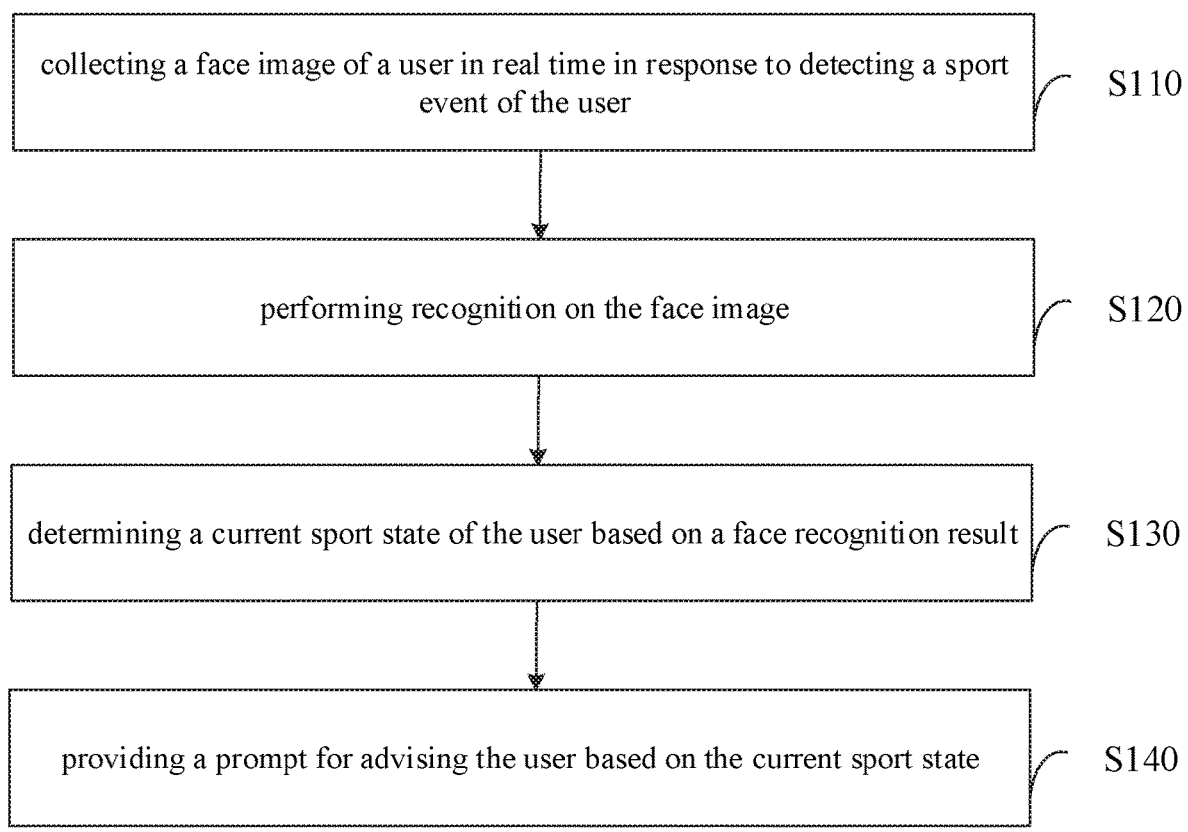
FIG. 1 is a flow chart illustrating a fitness guidance method provided in embodiment one of the present disclosure.

FIG. 1 is a flow chart illustrating a fitness guidance method provided in embodiment one of the present disclosure. This embodiment may be applicable to a condition that a user is exercising by using a fitness device or carrying a wearable device. The method may be performed by a fitness guidance apparatus. The apparatus may be implemented in the form of software and/or hardware. Typically, the apparatus may be configured in the fitness device and/or the wearable device. As illustrated in FIG. 1, the fitness guidance method in this embodiment includes actions in the following blocks.

In block S110, a face image of the user is collected in real time in response to detecting a sport event of the user.

In detail, the sport event of the user may be triggered by inputting a preset speech, or by pressing a physical button, or by other ways, which is not limited in the embodiments. Exemplarily, when the user is exercising by using the fitness device, starting of the fitness device may simultaneously trigger the foregoing sport event, and then a camera provided in the fitness device may start to collect the face image of the user.

In block S120, recognition is performed on the face image.

Alternatively, the recognition may be performed to identify at least one organ in the face image. For example, the recognition may be performed to identify a mouth, or a closed state of eyes. To improve accuracy of a face recognition result, the recognition may further be performed to identify a plurality of organ positions and shapes such as a pair of eyes, a nose and a mouth.

Typically, performing the recognition on the face image, may include: performing facial expression recognition on the face image.

In block S130, a current sport state of the user is determined based on the face recognition result.

The face recognition result may be shapes of one or more organs or a position relationship, or a specific expression. The sport state may be classified as needed, to typically sport normality and sport abnormality. The sport abnormality may be further classified to excessive abnormality, unwell sport abnormality and the like. To improve accuracy for advising the user, the current sport state may further be classified.

The method of determining the current sport state of the user based on the face recognition result, may be determined based on a preset mapping relationship between face recognition results and the current sport states; or may be determined by a model that is trained in advance, in which, the model needs to perform the preset training by taking face recognition results of known sport states as a sample.

In block S140, a prompt is provided for advising the user based on the current sport state.

In detail, firstly it is determined whether the current sport state is the sport abnormality. If yes, it is continuously determined which the sport abnormality corresponding to the current sport state, and finally the prompt is provided for advising based on the detailed abnormality.

Exemplarily, when it is detected that the current sport state is the excessive abnormality, a speech or an alarm prompt may prompt the user that "overdoing sport today, please sport tomorrow" and the other information.

To make the sport no longer boring, when it is detected that the current sport state is normal, and the sport is until a preset period, an encouragement speech is performed for the user, for example, "come on", "hold on one more time." and the like. Further, the prompt is provided for advising the user on a next sport program and/or sport duration.

To improve accuracy of advising, the prompt is provided for advising the user based on the current sport state may include: according to the current sport state, in conjunction with pre-stored historical sport data of the user and/or user attribute information, the prompt is provided for advising the user.

With the technical solutions of the embodiments of the present disclosure, by performing recognition on the face image of the user collected in real time, the current sport state of the user is determined based on the face recognition result, and the prompt is provided for advising the user based on the current sport state. Thus, the current sport state of the user may be detected by collecting the face image of the user in real time. When it is detected that the current sport state of the user is abnormal, the prompt may be provided for advising the user. Furthermore, the user may reduce sport intensity or stop the current sport according to the abnormal suggestion content, to reduce occurrence of accidents during sporting, or appearance of discomfort after sporting.

Embodiment Two

Figure 2:
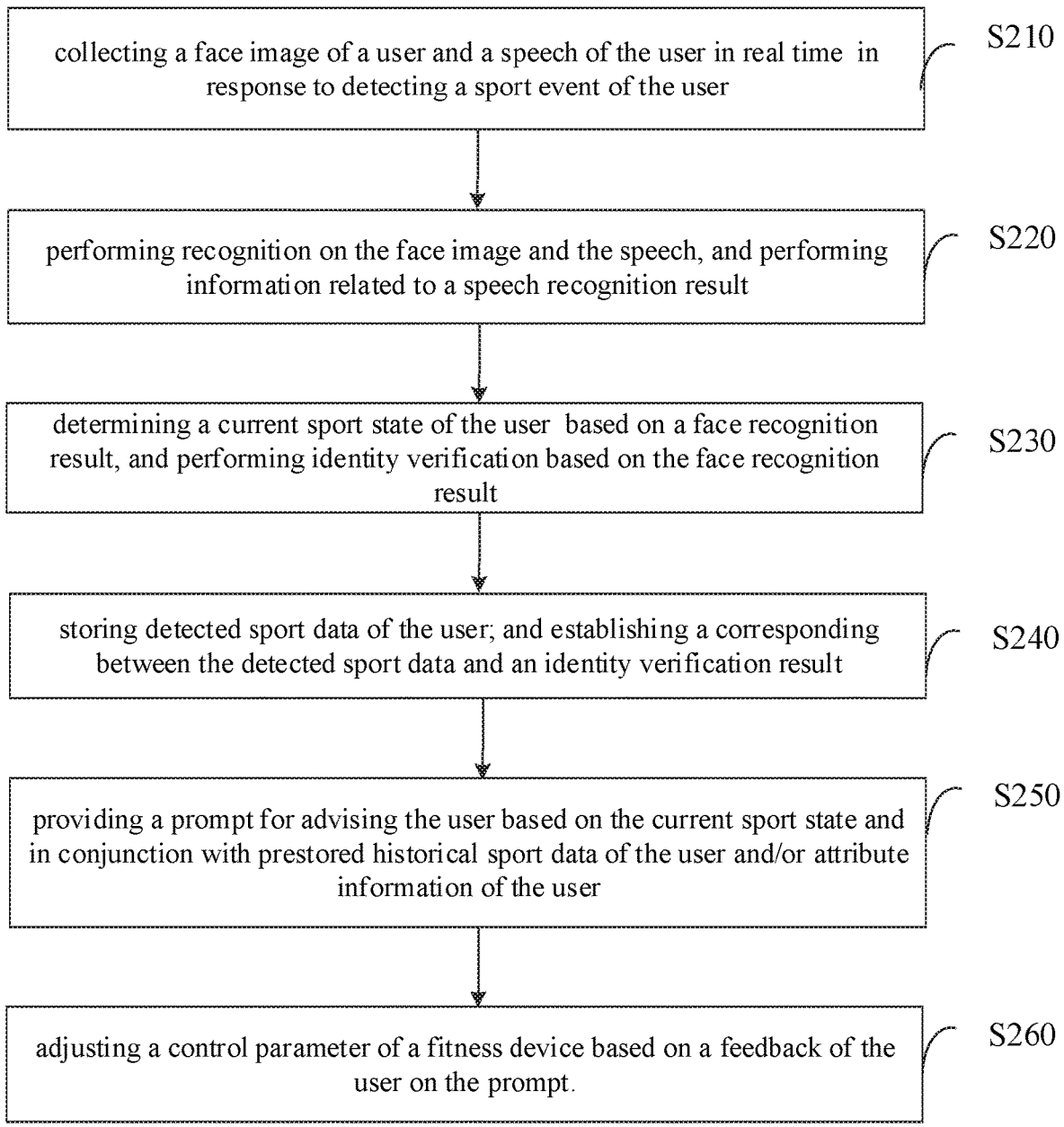
FIG. 2 is a flow chart illustrating a fitness guidance method provided in embodiment two of the present disclosure.

FIG. 2 is a flow chart illustrating a fitness guidance method provided in embodiment two of the present disclosure. This embodiment is an alternative one based on the foregoing embodiment. As illustrated in FIG. 2, the fitness guidance method in this embodiment includes actions in the following blocks.

In block 210, a face image of a user and a speech of the user are collected in real time in response to detecting a sport event of the user.

In block 220, recognition on the face image and recognition on the speech are performed, and information related to a speech recognition result is provided.

The information includes at least one of weather, news and video.

Exemplarily, during sporting, when a speech "today's weather" is obtained, the recognition is performed on this speech to obtain a speech recognition result of a text "today's weather". Today's weather is obtained from Internet or from related applications based on this speech recognition result. The weather information obtained is fed to the user in a screen or in a speech. Thus, when the user is sporting, he or she may know needed information easily.

In block S230, a current sport state of the user is determined based on a face recognition result, and identity verification is performed based on the face recognition result.

In block S240, detected sport data of the user is stored, and a corresponding between the detected sport data and an identity verification result is established.

The sport data of the user may be obtained by a fitness device, or by a wearable device that is carried when the user is sporting.

Alternatively, the corresponding between the sport data of the user and the identity verification result is stored in the fitness device or a local of the wearable device. To facilitate a plurality of devices to access the sport data, typically, the sport data of the user may be stored in a remote server. Therefore, the user may upload the sport data to the remote server or download the sport data from the remote server via the identify verification base on the plurality of devices.

Exemplarily, when the user sports by using a treadmill, a camera provided in the treadmill may collect the face image to reform the face recognition and the identify verification. After the identify verification passes, a corresponding between the sport data generated by the treadmill and the identity verification result is stored in the remote server, to realize the uploading of the sport data.

The recognition of the face image and the identity verification may be implemented in the treadmill, or in the remote server, which is not limited in the embodiments.

After the identity verification is failed, the user may be prompted to input a username and a password manually to perform the identity verification. Or, when determining that the user has not registered, to facilitate register of the user, a speech prompt may be used to prompt the user to register. When the speech recognizes an affirmative feedback from the user, the face image is collected, and simultaneously other attribute information such as contact number, gender, age, illness of the user may be obtained by the speech recognition, such that the register of a new user is performed for the user.

The user may download sport data during a specified time period from the remote server and further process the sport data based on a phone or other devices after the identity verification passes, to realize the downloading of the sport data.

In block S250, the prompt is provided for advising the user based on the current sport state and in conjunction with prestored historical sport data of the user and/or attribute information of the user.

In detail, when determining that the user does not sport in a recent time period based on the historical sport data and the current sport state is tired, the prompt is provided for advising the user to have a rest, avoiding one-time overdosing to cause discomfort after sporting.

Further, sport intensity of the user is determined by the sport data detected. When the sport intensity is greater than a preset intensity value corresponding to diseases in attribute information of the user and the current sport state is normal, the prompt is provided for advising the user to reduce the sport intensity, avoiding occurrence of accidents.

The sport intensity may be determined based on a sport item, for example, in a running item, the sport intensity may be determined based on the speed; in an exercise bike item, the sport intensity may be determined in conjunction with a speed and a resistance parameter in a resistance system.

Further, in conjunction with the prestored historical sport data of the user and/or attribute information of the user, a sport program is tailored for the user based on the current sport state, which is pushed to the user for reference.

In block S260, a control parameter of the fitness device is adjusted based on a feedback of the user on the prompt.

In detail, when recognizing a positive feedback of the user on the prompt, the control parameter of the fitness device is adjusted based on the content of the prompt. Typically, the control parameter of the fitness device in the resistance system is adjusted, to adapt to the content of the prompt.

Exemplarily, the sport item is a spinning, and the content of the prompt is to reduce the sport intensity. When recognizing the positive feedback of the user, a control parameter of the resistance system of the spinning is adjusted automatically, to adapt to the foregoing sport intensity.

Figure 3:
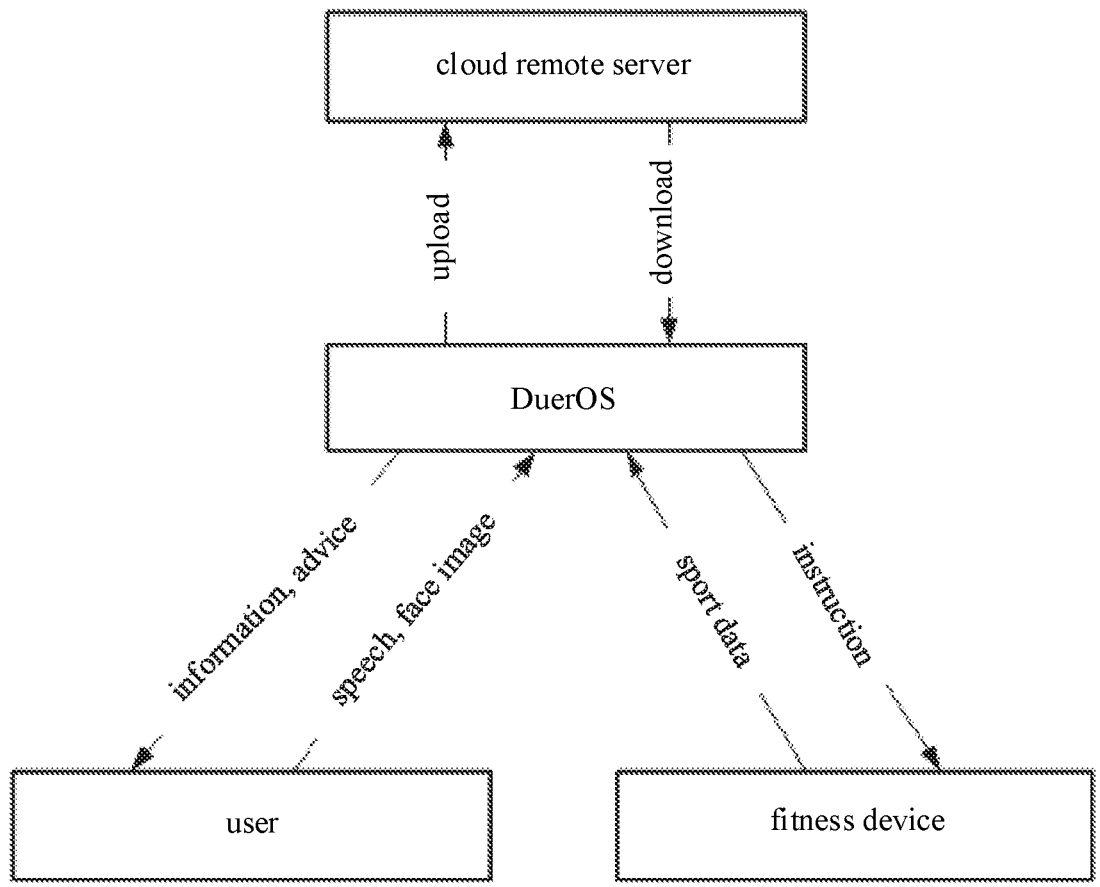
FIG. 3 is a signaling diagram among a fitness device, a user, a DuerOS system and a remote server provided in embodiment two of the present disclosure.

The foregoing fitness guidance method may be applicable to the fitness device, or to the wearable device which is carried when the user is sporting. As illustrated in FIG. 3, typically, in an actual application, when applied to the fitness device, the fitness guidance method may be described as the following. The fitness device accesses to a DuerOS system (a voice-controlled intelligent personal assistant service provided by Baidu, Inc., and Baidu, Inc. is a Chinese multinational technology company specializing in Internet-related services and products, and artificial intelligence). When the user uses the fitness device, a user account may be logged in based a recognition result of the collected face image of the user, and the sport data of the user may be synchronized to the remote server in the cloud in real time, in which, the sport data may be obtained precisely by the fitness device. During the user sports by using the fitness device, the prestored historical sport data of the user and/or attribute information of the user corresponding to the user account, are analyzed, and the user is given appropriate fitness programs, sport programs, sport tutorials, sport articles, nutritious foods and the like according to the analysis result. The face image of the user is collected in real time, and the facial expression recognition is performed on the face image of the user. The current sport state of the user is analyzed based on the recognition result, and the next sport advice is pushed to the user, and corresponding encouragement may further be given based the current sport state of the user. Further, during the user sports by using the fitness device, the speech of the user is collected in real time, and the information needed by the user may be fed to the user based on the speech recognition result, or the resistance system in the fitness device is adjusted intelligently according to instructions in the speech recognition result.

The cloud remote server may store: user attributes, user historical sport data, and user fitness test data. The user attributes may include: age, gender, height, weight, lung capacity and the like. The user historical sport data may include: running, fat loss, abdominal muscle tears, marathon and other sports, heart rate, exercise duration, mileage and other data. The user fitness test data may be: 1 km running, 2 km running, 5 km running, pull-ups, marathon and other recorded data.

With the technical solutions of the embodiments of the present disclosure, based on the current sport state, and in conjunction with the prestored historical sport data of the user and/or the attribute information of the user, the prompt is provided for advising the user. Thus, accuracy for advising the user is improved, and the content for prompt is enriched. Simultaneously, the sport parameter of the fitness device is adjusted automatically based on the feedback of the user on the prompt, to enable the user to sport scientifically and rationally.

Embodiment Three

Figure 4:
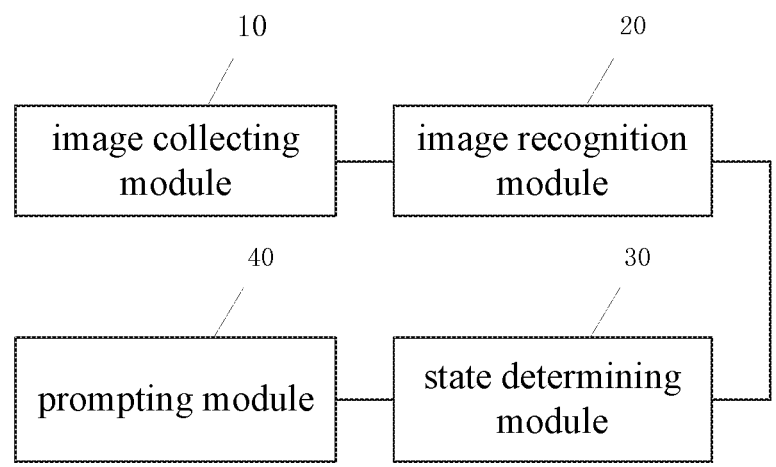
FIG. 4 is a block diagram illustrating a fitness guidance apparatus provided in embodiment three of the present disclosure.

FIG. 4 is a block diagram illustrating a fitness guidance apparatus provided in embodiment three of the present disclosure. Typically, the apparatus is configured in a fitness device and/or a carrying wearable device during sporting. As illustrated in FIG. 4, the fitness guidance apparatus provided in this embodiment includes an image collecting module 10, an image recognition module 20, a state determining module 30 and a prompting module 40.

The image collecting module 10 is configured to collect a face image of a user in real time in response to detecting a sport event of the user.

The image recognition module 20 is configured to perform recognition on the face image.

The state determining module 30 is configured to determine a current sport state of the user based on a face recognition result.

The prompting module 40 is configured to advise the user based on the sport state.

With the technical solutions of the embodiments of the present disclosure, by performing recognition on the face image of the user collected in real time, the current sport state of the user is determined based on the face recognition result, and the prompt is provided for advising the user based on the current sport state. Thus, the current sport state of the user may be detected by collecting the face image of the user in real time. When it is detected that the current sport state of the user is abnormal, the prompt may be provided for advising the user. Furthermore, the user may reduce sport intensity or stop the current sport according to the abnormal suggestion content, to reduce occurrence of accidents during sporting, or appearance of discomfort after sporting.

In one or more embodiments, the image recognition module 20 includes an expression recognition unit. The expression recognition unit is configured to perform facial expression recognition on the face image.

In one or more embodiments, the fitness guidance apparatus includes an automatic control module. The automatic control module is configured to adjust a control parameter of a fitness device based on a feedback of the user on the prompt after providing the prompt for advising the user based on the current sport state.

In one or more embodiments, the fitness guidance apparatus includes a verification module and a storage module. The verification module is configured to perform identity verification based on the face recognition result after performing recognition on the face image. The storage module is configured to store detected sport data of the user and to establish a corresponding between the detected sport data and an identity verification result.

In one or more embodiments, the prompting module 40 is configured to provide the prompt for advising the user based on the current sport state and in conjunction with prestored historical sport data of the user and/or attribute information of the user.

In one or more embodiments, the fitness guidance apparatus further includes a speech collecting module and an information feedback module. The speech collecting module is configured to collect a speech of the user in real time when collecting the face image of the user in real time. The information feedback module is configured to perform recognition on the speech and provide information related to a speech recognition result, in which the information includes at least one of weather, news and video.

Embodiment Four

Figure 5:
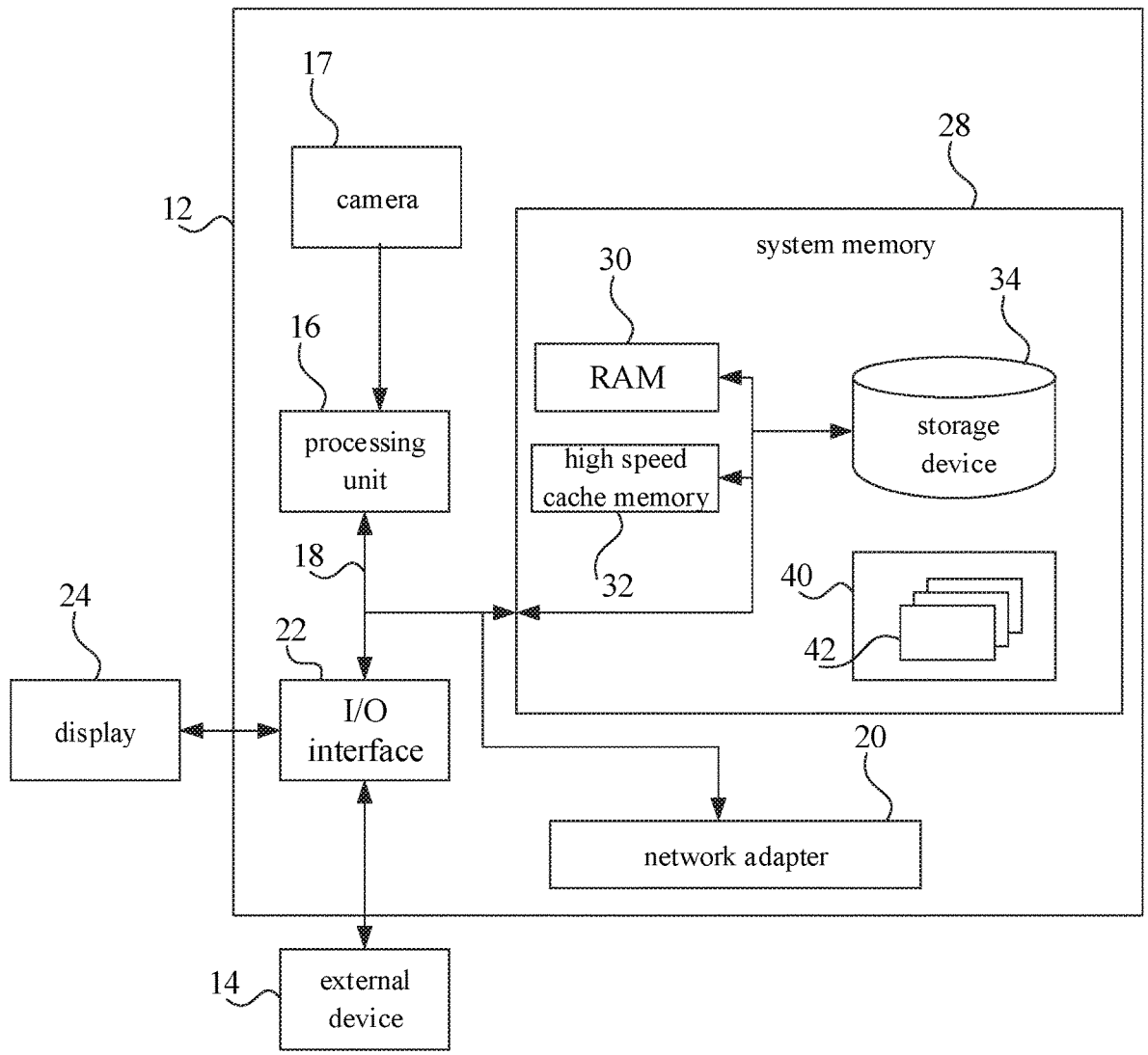
FIG. 5 is a block diagram illustrating a device provided in embodiment four of the present disclosure.

FIG. 5 is a block diagram illustrating a device provided in embodiment four of the present disclosure. FIG. 5 illustrates the block diagram of an exemplary device 12 for implementing embodiments of the present disclosure. The device 12 displayed by FIG. 5 is only an example, and does not limit functions and using scopes of the embodiments of the present disclosure.

As illustrated in FIG. 5, the device 12 is represented in the form of a general computer device. Components of the device 12 may include but be not limited to: one or more processors or processing units 16, a system memory 28, a bus 18 connected different system components (including the system memory 28 and the processing units 16), and at least one camera 17 that is configured to collect a face image of a user when detecting a sport event of the user.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The device 12 typically includes a variety of computer system readable media. These media may be any available media accessible by the device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The device 12 may further include other removable or non-removable, volatile or non-volatile computer system storage media. By way of example only, the storage device 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The device 12 may also communicate with one or more external devices 14 (such as, a keyboard, a pointing device, a display 24, etc.). Furthermore, the device 12 may also communicate with one or more communication devices enabling a user to interact with the device 12 and/or other devices (such as a network card, modem, etc.) enabling the device 12 to communicate with one or more computer devices. This communication can be performed via the input/output (I/O) interface 22. Also, the device 12 may communicate with one or more networks (such as a local area network (hereafter referred to as LAN), a wide area network (hereafter referred to as WAN) and/or a public network such as an Internet) through a network adapter 20. As shown in FIG. 5, the network adapter 20 communicates with other modules of the device 12 over the bus 18. It should be understood that, although not shown in FIG. 5, other hardware and/or software modules may be used in connection with the device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the s fitness guidance method.

Embodiment Five

Embodiment five of the present disclosure provides a computer readable storage medium, stored with computer programs thereon. The computer programs are configured to be executed to implement the fitness guidance method according to embodiment one.

The computer readable storage medium provided by embodiments of the present disclosure, may adopt combinations of the one or more computer readable mediums. The computer readable medium may be a computer readable signal medium or a computer readable storage medium. The computer readable storage medium may be, for example, but not limited to, electronic, magnetic, optical, electromagnetic, infrared, or semiconductor system, apparatus, or device, or any suitable combination of the foregoing. More specific examples (an non-exhaustive list) of the computer readable medium include but are not limited to: an electronic connection with one or more wires, a portable computer enclosure, a magnetic device, a hard disk, a random access memory (RAM), a read only memory (ROM), an erasable programmable read-only memory (EPROM or a flash memory), an optical fiber device and a portable compact disk read-only memory (CD-ROM), an optical storage device, a magnetic storage device or any suitable combination of the foregoing. In the file, the computer readable storage medium may be any tangible medium containing or storing programs, and the programs may be used by an instruction execution system, an apparatus or a device or used in combination therewith.

The storage medium provided by embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims

What is claimed is:

1. A computer-implemented fitness guidance method, comprising:
    collecting, by a wearable device, a face image of a user in real time in response to detecting a sport event of the user;
    performing, by the wearable device, recognition on the face image;
    determining, by the wearable device, a current sport state of the user based on a model that is trained by taking face recognition results of known sport states as samples in advance;
    performing, by the wearable device, identity verification based on the face recognition result;
    storing, by the wearable device, detected sport data of the user;
    establishing, by the wearable device, a corresponding between the detected sport data and an identity verification result;
    providing, by the wearable device, a prompt for advising the user based on the current sport state;
    collecting, by the wearable device, a speech of the user in real time;
    performing, by the wearable device, recognition on the speech to obtain a speech recognition result;
    sending, by the wearable device, the speech recognition result to Internet; and
    providing, by the wearable device, information related to a speech recognition result from the Internet, wherein the information comprises at least one of weather, news and video.

2. The method according to claim 1, wherein, performing recognition on the face image comprises:
    performing facial expression recognition on the face image,
    wherein the sport state comprises sport normality, sport abnormality, or excessive abnormality.

3. The method according to claim 1, wherein, providing the prompt for advising the user based on the current sport state, comprises:
    providing the prompt for advising the user based on the current sport state and in conjunction with prestored historical sport data of the user and/or attribute information of the user.

4. The method according to claim 1, further comprising:
    adjusting, by the wearable device, a control parameter of a fitness device based on a feedback of the user on the prompt.

5. A wearable device, comprising:
    one or more processors;
    at least one camera, configured to collect a face image of a user in real time in response to detecting a sport event of the user; and
    a storage device, configured to store one or more programs;
    wherein the one or more processors are configured to execute the one or more programs to implement following actions:
    collecting a face image of a user in real time in response to detecting a sport event of the user;
    performing recognition on the face image;
    determining a current sport state of the user based on a model that is trained by taking face recognition results of known sport states as samples in advance;
    performing identity verification based on the face recognition result;
    storing detected sport data of the user;
    establishing a corresponding between the detected sport data and an identity verification result;
    providing a prompt for advising the user based on the current sport state;
    collecting, by the wearable device, a speech of the user in real time;
    performing, by the wearable device, recognition on the speech to obtain a speech recognition result;
    sending, by the wearable device, the speech recognition result to Internet; and
    providing, by the wearable device, information related to a speech recognition result from the Internet, wherein the information comprises at least one of weather, news and video.

6. The device according to claim 5, wherein, performing recognition on the face image comprises:

wherein the sport state comprises sport normality, sport abnormality, or excessive abnormality.

7. The device according to claim 5, wherein, providing the prompt for advising the user based on the current sport state, comprises:

providing the prompt for advising the user based on the current sport state and in conjunction with prestored historical sport data of the user and/or attribute information of the user.

8. The device according to claim 5, wherein the one or more processors are configured to execute the one or more programs to implement following further actions:

adjusting a control parameter of a fitness device based on a feedback of the user on the prompt.

9. A non-transitory computer readable storage medium, stored with computer programs thereon, wherein the computer programs are configured to be executed to implement the implement a fitness guidance method including:

collecting a face image of a user in real time in response to detecting a sport event of the user;

performing recognition on the face image;

determining a current sport state of the user based on a model that is trained by taking face recognition results of known sport states as samples in advance;

performing identity verification based on the face recognition result;

storing detected sport data of the user;

establishing a corresponding between the detected sport data and an identity verification result;

providing a prompt for advising the user based on the current sport state;

collecting, by the wearable device, a speech of the user in real time;

performing, by the wearable device, recognition on the speech to obtain a speech recognition result;

sending, by the wearable device, the speech recognition result to Internet; and providing, by the wearable device, information related to a speech recognition result from the Internet, wherein the information comprises at least one of weather, news and video.

10. The non-transitory computer readable storage medium according to claim 9, wherein, performing recognition on the face image comprises:

performing facial expression recognition on the face image, wherein the sport state comprises sport normality, sport abnormality, or excessive abnormality.

11. The non-transitory computer readable storage medium according to claim 9, wherein, providing the prompt for advising the user based on the current sport state, comprises:

providing the prompt for advising the user based on the current sport state and in conjunction with prestored historical sport data of the user and/or attribute information of the user.

12. The non-transitory computer readable storage medium according to claim 9, wherein the method further comprises:

adjusting a control parameter of a fitness device based on a feedback of the user on the prompt.

* * * * *